Oct. 19, 1954 H. A. MOORE 2,692,338

ELECTRONIC OSCILLATOR SWITCHING SYSTEM

Filed March 26, 1951

INVENTOR
Harold A. Moore
BY
Charles H. Brown
ATTORNEY

Patented Oct. 19, 1954 2,692,338

UNITED STATES PATENT OFFICE 2,692,338

ELECTRONIC OSCILLATOR SWITCHING SYSTEM

Harold A. Moore, Hampton Bays, N. Y., assignor to Radio Corporation of America, a corporation of Delaware Application March 26, 1951, Serial No. 217,642

The terminal 15 years of the term of the patent to be granted has been disclaimed 2 Claims. (Cl. 250—36)

This invention relates to a switching system, and more particularly to an arrangement for selectively applying the output of one or the other of a pair of oscillators to a single output connection or circuit.

An object of this invention is to advise an arrangement whereby one oscillator may be substituted for another, in a common output circuit, in a minimum time and with a minimum amount of effort.

Another object is to devise a novel arrangement for alternatively coupling one or the other of a pair of oscillators to a common output circuit.

A further object is to provide a switching arrangement wherein the output of one oscillator or another may be coupled to a common output circuit, entirely independently of the other oscillator.

A still further object is to accomplish the foregoing objects in an effective and highly efficient manner.

A detailed description of the invention follows in conjunction with drawings, wherein.

The objects of this invention are accomplished, briefly, in the following manner: A resonant circuit serves as the tank circuit of a first oscillator, and the common output circuit is connected to this tank circuit. A second oscillator can feed its output through a coupling tube to this same resonant circuit and thereby to the common output circuit. A double-pole two-position switch is provided, this switch being effective in one position to energize the first oscillator tube, to de-energize the coupling tube and to bypass to ground the output of the second oscillator; in its other position, this switch is effective to de-energize the first oscillator tube, to energize the coupling tube and to connect the output of the second oscillator to the input of the coupling tube. In this way, the common output circuit may be supplied selectively from the first or the second oscillator.

Figure 1:
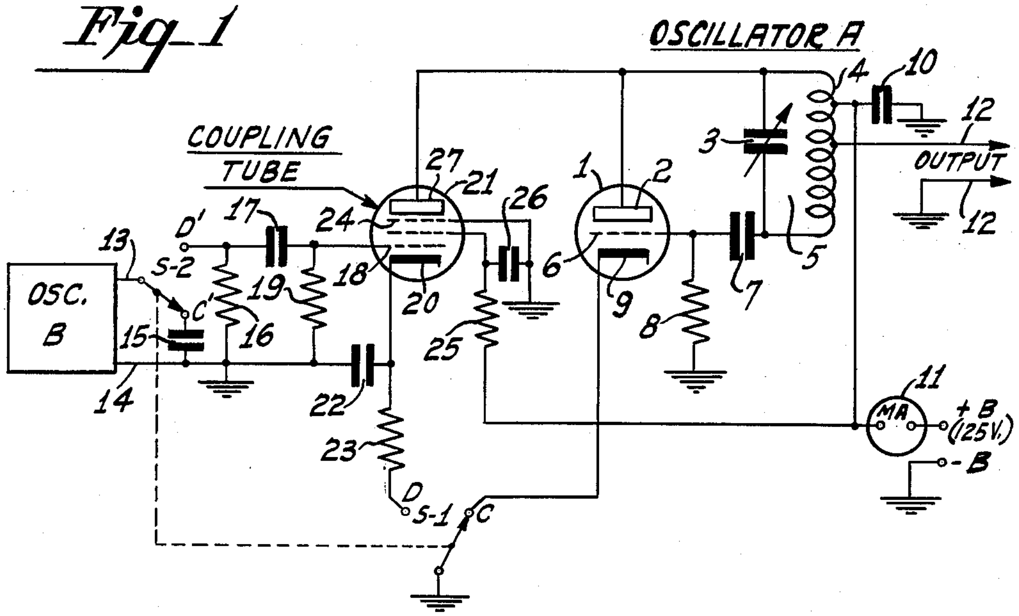
Fig. 1 is a circuit diagram of an arrangement according to this invention.

Referring to Fig. 1, oscillator A includes a triode vacuum tube 1, for example a Type 37 tube, connected in a Hartley oscillator circuit. For this purpose, the anode 2 of tube 1 is connected to one end of an inductance-capacitance (LC) parallel resonant tank circuit 5 comprising a variable capacitance 3 and an inductance 4. The opposite end of tank circuit 5 is connected to the grid 6 of tube 1 through a coupling capacitor 7, a leak resistor 8 being connected from the grid side of capacitor 7 to ground. To complete the oscillatory circuit, an intermediate tap on inductance 4 is coupled to the cathode 9 of tube 1 by means of a capacitor 10 connected between such intermediate tap and ground; cathode 9 is connected to ground when switch S-1 is on its C contact, such contact being connected directly to cathode 9 and the movable arm of switch S-1 being grounded. In order to provide operating potentials to the anode and cathode of tube 1, the positive terminal of a source of unidirectional potential, having a value of 125 volts for example, is connected through a milliameter 11 to the same intermediate tap on inductance 4 to which capacitor 10 is connected and to complete the D. C. circuit the negative terminal of the unidirectional potential source is grounded. The oscillator output is taken off from tank circuit 5 by means of a pair of output leads 12, one of which is grounded and the other of which is connected to another intermediate tap on inductance 4.

Oscillator B is provided as an alternative to oscillator A insofar as the common output circuit is concerned. Oscillator B has its own oscillatory circuit and the oscillatory output thereof appears between a pair of output leads 13 and 14, lead 14 being grounded as shown. The movable arm of a switch S-2 is connected to lead 13. Switch S-2 is ganged to switch S-1 and is on its C′ contact when switch S-1 is on its C contact and is on its D′ contact when switch S-1 is on its D contact. In effect, the switches S-1 and S-2 can be considered a double-pole two-position switch. A shunting capacitor 15 is connected between contact C′ of switch S-2 and ground or lead 14, so that capacitor 15 is connected across leads 13 and 14, and shunts radio frequency energy from oscillator B to ground, when switch S-2 is on its C′ contact.

When S-1 is on its C contact as illustrated, S-2 is on its C′ contact as illustrated. In this switch position, switch S-1 connects the cathode 9 to ground and completes the circuit to tube 1. Oscillator A now functions to produce oscillations and supplies the output leads 12 with a radio frequency voltage which is dependent on the characteristics of oscillator A. In this switch position, capacitor 15 is connected across the output of oscillator B by means of switch S-2; radio frequency energy from oscillator B is now shunted to ground via capacitor 15. Under these conditions, when oscillator A is supplying excitation to output leads 12, meter 11 indicates the oscillator plate current.

In actual practice, capacitor 15 may or may not be necessary, depending on the physical arrangement of the circuit components and the amount of radio frequency radiation from oscillator B that is present.

Generally, oscillator A as described consists of a simple Hartley circuit and is one of the original components of the receiver in conjunction with which the system of this invention is adapted to be used. Oscillator B preferably consists of a high quality oscillator arrangement, using high grade components with low temperature coefficients, the components being installed in a thermostatically controlled oven. The anode voltage supplied to oscillator B is preferably regulated. It is often desired to supply the output connections 12 from an oscillator which is better than that provided in the original equipment, namely, oscillator A; such a better oscillator is oscillator B. The system of this invention allows output leads 12 to be energized from the output of oscillator B, rather than from the output of oscillator A, merely by operating the ganged switches S—1 and S—2.

A load resistor 16 is connected between contact D′ of switch S—2 and ground, the voltage across this resistor being coupled through a capacitor 17 of a resistance-capacitance input coupling arrangement to the control grid 18 of a pentode 21, for example of the 6SG7 Type. A leak resistor 19 is connected from the grid side of capacitor 17 to ground. The cathode 20 of pentode coupling tube 21 is bypassed to ground by a capacitor 22 and is connected through a resistor 23 to contact D of which S—1. Therefore, when switch S—1 is on D contact, the cathode 20 is connected to ground or the negative side of the unidirectional potential source. The suppressor grid 24 of tube 21 is grounded, while the screen grid of this tube is connected to the positive terminal of the unidirectional potential source through a resistor 25 and meter 11. A bypass capacitor 26 is connected from this screen grid to ground. The anode 27 of tube 21 is connected to the upper or high potential end of resonant circuit 5 and is supplied with anode potential through coil 4 and meter 11.

The circuit of coupling tube 21 is a more or less conventional resistance-capacitance radio frequency amplifier circuit, except for the anode circuit thereof, which is connected in parallel with that of tube 1. Anode current for the coupling tube 21 must pass through the tank coil 4 of oscillator A.

The cathode circuits of both tubes 21 and 1 go to ground by way of switch S—1. In order to make oscillator A function, switch S—1 must be placed on contact C as illustrated, thus connecting the cathode of oscillator tube 1 to ground and energizing this tube. This opens the cathode circuit of tube 21 at contact D, rendering such tube inoperative and de-energizing the same by stopping the anode and screen current flow to this tube, thereby reducing the chances of oscillator B energy getting into oscillator A circuits. The anode capacitance to ground of tube 21 is now left to appear across part of the oscillator tank coil 4 as a fixed amount of capacitance. Under these conditions, oscillator A functions in the normal manner, the output of oscillator B being shunted to ground by capacitor 15 and the input circuit to control grid 18 being opened at D′. The common output leads 12 are then supplied with oscillatory energy from oscillator A.

When switches S—1 and S—2 are placed on their D—D′ contacts, the cathode circuit of oscillator tube 1 is opened at contact C, de-energizing this tube and rendering such tube inoperative for the production of oscillations. The closing of S—1 on D contact completes the cathode circuit of tube 21, energizing this tube and rendering it operative. At the same time, switch S—2, closing on its D′ contact, removes the shunting capacitor 15 from across the output of oscillator B and connects the output of oscillator B via contact D′ and capacitor 17 to the control grid of coupling tube 21. Under these conditions, oscillator A is inoperative and the coupling tube 21 is operative to amplify oscillatory energy supplied thereto from oscillator B and to pass such oscillatory energy on to output connections 12 through circuit 5, which now functions as an RF coupling circuit or network. The common output leads 12 are then supplied with oscillatory energy from oscillator B.

Therefore, when switches S—1 and S—2 are on the C–C′ contacts, the output connections 12 are supplied with oscillatory energy by oscillator A, while when switches S—1 and S—2 are on the D–D′ contacts, the output connections are supplied with oscillatory energy by oscillator B.

When switches S—1 and S—2 are on the D–D′ contacts, the tank circuit 5 of oscillator A is still tunable in the manner of an RF tuned circuit. To obtain maximum output voltage from the oscillator B, this circuit must be tuned by means of tuning capacitor 3 to the frequency of oscillator B. When adjusting the circuit 5 to resonance at the frequency of oscillator B, the meter 11 acts as a tuning indicator, giving a dip in reading at resonance. In an embodiment of this invention which was built and successfully tested, wherein the system was used in a diversity receiver, coil 4 was one of the original oscillator coils supplied with the diversity receiver. These coils are of the plug-in type, giving oscillator A a freqeuncy range of 3 megacycles to 24 megacycles. It is desired to be pointed out, however, that oscillator A has greater freqeuncy range than is indicated by these values, when suitable coils are used; the experimental tests covered the range of 3–24 megacycles merely as a sample. Of course, oscillator B should have a freqeuncy lying somewhere in the same portion of the frequency spectrum.

Oscillator A is illustrated in Fig. 1 as being a Hartley oscillator, but this has been done only for the sake of convenience. Other types of oscillators may operate equally well in the system, and the showing in Fig. 1 in no sense implies that the Hartley oscillator is the only type that may be made to function in the system of this disclosure.

Up to this point, the description has been limited to an arrangement in which oscillator B is associated with a single oscillator A. However, it is possible to apply the concept of this invention to multiple equipment such as a diversity receiver employing three receiving units. In this application, the oscillator output would be applied to the high frequency detectors of the receiving units as a heterodyning signal. In other words, the concept of this invention includes an arrangement for supplying a highly stabilized RF oscillator voltage for heterodyning purposes to the high frequency mixer tube of a diversity receiver, instead of the conventional RF oscillator voltage normally used for such purposes.

Figure 2:
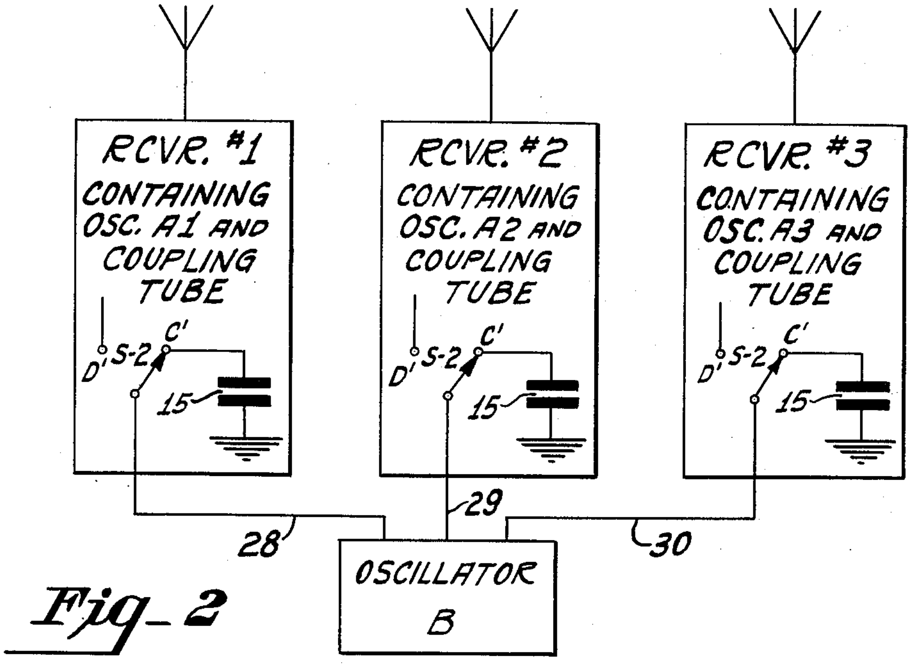
Fig. 2 is a schematic illustration of an application of the invention to a diversity receiver.

Fig. 2 illustrates an arrangement of the type just described. In this three-set diversity system, three RF tuner units are provided, these units being indicated as receivers #1, #2 and

#3, respectively, in Fig. 2. Each of these tuner units is provided with a respective oscillator A and also with a coupling tube arrangement as illustrated in detail in Fig. 1. In other words, each of the receivers in Fig. 2 includes all of the circuit components in Fig. 1, with the exception of oscillator B. The switches S-1 and S-2 in each receiver are operable separately from the corresponding switches in the remaining receivers.

In Fig. 2, oscillator B is provided with three paralleled RF output circuits, the ungrounded leads of which are indicated at 28, 29 and 30. Lead 28 goes to receiver #1, lead 29 to receiver #2 and lead 30 to receiver #3. Each of these leads would correspond to lead 13 in Fig. 1 and each lead goes to the movable arm of a respective switch S-2, as in Fig. 1.

Oscillator B is provided with one RF output circuit for the RF oscillator A in each RF tuner unit in Fig. 2. With this arrangement, oscillator B is made common to all three receivers when switches S-1 and S-2 of all three tuner units are in their D—D′ positions. The switch S-1, S-2 of any of the receivers may be operated at will to its C—C′ position to substitute oscillator A of such receiver for oscillator B, as a heterodyning signal.

If two or more receivers of Fig. 2 are tuned to the same signal frequency, it is necessary to tune the individual oscillators A of such receivers and also the common oscillator B to a heterodyning frequency which has a frequency value which is above or below the signal frequency by an amount equal to the first intermediate frequency. The individual oscillators A and the common oscillator B may have the same frequency, or it is possible, for example, to have oscillators A1, A2 and A3 or any combination thereof on the opposite side of the signal frequency from oscillator B. If different signal frequencies are being received on different receivers (in which event, of course, one or more of the receivers in Fig. 2 would be supplied from its own oscillator A, rather than from the common oscillator B), certain of the individual oscillators A would have frequencies different from that of common oscillator B.

The arrangement of Fig. 2 has several advantages. First, if oscillator B has good frequency stability, then the frequency stability of the diversity receiver as a whole will be good when the receivers are supplied with heterodyning energy from this common oscillator.

In the next place, with prior "commoned oscillator" arrangements there is only one oscillator for two or more receivers or receiving sets; with such systems it is impossible to split a diversity receiver into single set operation or into a combination of two-set diversity plus a single set. In the Fig. 2 arrangement, on the other hand, any individual receiver can be switched back to its local oscillator (oscillator A) and then operated independently on the same or other signals. This permits the diversity receiver to operate "two-set" while the third is used for "exploration." Or, the three sets may be operated as three single sets if so desired.

Furthermore, the Fig. 2 arrangement does not limit the flexibility of the receiver, as do other "commoned oscillator" arrangements. In other (prior) arrangements using a common oscillator, if such common oscillator fails the whole diversity receiver is inoperative until repairs are made. In the present arrangement, on the other hand, if the common oscillator fails operation can be continued for the period of repair, simply by switching the receivers back to their individual oscillators A.

In prior "commoned oscillator" systems, it would be possible to remove individual receivers from a diversity group only if the oscillator system is properly arranged. If the arrangement is such that one receiver's high frequency oscillator is commoned to the other two receivers (without oscillators), it is impossible to remove said one receiver from the diversity system without disrupting the received signal and the flexibility of the receiver is reduced. In the present arrangement, however, individual receivers may be removed from the diversity group for service, both circuitwise and physically, without disrupting the received signal or without affecting the signal circuit. Thus, the flexibility of the receiver is not impaired in any way.

In an embodiment of the invention which was built and successfully tested, the following values of circuit components were used. It is to be understood that such values are given merely by way of example and the invention is not to be limited in any way thereby.

| | | |
|---|---|---|
| Capacitor **15** | mfd | 0.01 |
| Capacitor **17** | mmfd | 100 |
| Capacitor **22** | mfd | 0.01 |
| Capacitor **26** | mfd | 0.01 |
| Capacitor **7** | mmfd | 68 |
| Capacitor **10** | mfd | 0.006 |
| Resistor **16** | ohms | 100 |
| Resistor **19** | megohms | 1 |
| Resistor **23** | ohms | 300 |
| Resistor **25** | do | 100 |
| Resistor **8** | do | 100,000 |

What I claim to be my invention is as follows:

1. In combination, a first source of oscillatory energy, a second source of oscillatory energy including an electronic device and also including a tuned circuit wherein such oscillatory energy appears, an electron discharge device having input electrodes and having output electrodes coupled to said tuned circuit, a source of energizing power for said second source and for said discharge device, and two-position controllable switching means effective in one position to connect said second source to said power source and to disconnect said discharge device from said power source and in the other position to disconnect said second source from said power source, to connect said discharge device to said power source and to connect the output of said first source to the input electrodes of said discharge device.

2. The combination defined in claim 1, wherein the switching means is also effective in said one position to bypass the output energy of said first source to ground.

References Cited in the file of this patent

UNITED STATES PATENTS

| Number | Name | Date |
|---|---|---|
| 2,186,182 | Stocker et al. | Jan. 9, 1940 |
| 2,192,978 | Macnabb | Mar. 12, 1940 |
| 2,270,771 | Schonfeld | Jan. 20, 1942 |
| 2,457,830 | Moynahan, Jr. | Jan. 4, 1949 |
| 2,525,053 | Vilkomerson | Oct. 10, 1950 |
| 2,578,335 | Baylor | Dec. 11, 1951 |

OTHER REFERENCES

Radio Amateur's Handbook, 1946 edition, pages 338-340.